US006401077B1

(12) United States Patent
Godden et al.

(10) Patent No.: US 6,401,077 B1
(45) Date of Patent: Jun. 4, 2002

(54) METHOD AND SYSTEM FOR PROVIDING ADDITIONAL BEHAVIOR THROUGH A WEB PAGE

(75) Inventors: Glenn Godden; John Guthrie, both of Seattle, WA (US)

(73) Assignee: Network Commerce, Inc., Seattle, WA (US)

( * ) Notice: Subject to any disclaimer, the term of this patent is extended or adjusted under 35 U.S.C. 154(b) by 0 days.

(21) Appl. No.: 09/322,963

(22) Filed: May 28, 1999

(51) Int. Cl.[7] .......................... G06F 17/60; G06F 15/16; G06F 15/00; G06F 17/00; G06F 17/21

(52) U.S. Cl. .......................... 705/26; 705/27; 707/513; 709/217; 709/219

(58) Field of Search .............................. 705/1, 26, 27; 707/501, 513; 709/217, 218, 219

(56) References Cited

U.S. PATENT DOCUMENTS

| | | | | |
|---|---|---|---|---|
| 4,754,326 A | | 6/1988 | Kram et al. | |
| 4,768,144 A | | 8/1988 | Winter et al. | |
| 4,799,156 A | | 1/1989 | Shavit et al. | |
| 5,113,496 A | | 5/1992 | McCalley et al. | |
| 5,319,562 A | | 6/1994 | Whitehouse | |
| 5,329,589 A | | 7/1994 | Fraser et al. | |
| 5,557,518 A | | 9/1996 | Rosen | |
| 5,572,643 A | * | 11/1996 | Judson | 709/218 |
| 5,590,197 A | | 12/1996 | Chen et al. | |
| 5,671,279 A | | 9/1997 | Elgamal | |
| 5,687,322 A | | 11/1997 | Deaton et al. | |
| 5,701,451 A | * | 12/1997 | Rogers et al. | 707/1 |
| 5,710,887 A | | 1/1998 | Chelliah et al. | |
| 5,715,314 A | | 2/1998 | Payne et al. | |
| 5,717,860 A | * | 2/1998 | Graber et al. | 709/227 |

(List continued on next page.)

FOREIGN PATENT DOCUMENTS

| | | | |
|---|---|---|---|
| EP | 0 762 297 A2 | | 3/1997 |
| JP | 11-15722 | * | 1/1999 |
| WO | WO 98/45793 | * | 10/1998 |

OTHER PUBLICATIONS

Tanenbaum, A. S., Computer Networks, third edition, pp. 688–689, 1996.*
Microsoft Press Computer Dictionary, third edition, pp. 197 and 387, 1997.*
"Microsoft Merchant Server Arrives in Russia Jun. 2, 1997," Newsbytes, Jun. 2,1997.*
Webber, S., "Search Engines and News Services: Developments on the Internet" (Abstract only), Business Information Review, vol. 15, No. 4, pp. 229–237, Dec. 1998.*

(List continued on next page.)

*Primary Examiner*—Wynn Coggins
*Assistant Examiner*—Nicholas David Rosen
(74) *Attorney, Agent, or Firm*—Perkins Coie LLP

(57) ABSTRACT

A method and system for enabling a page description provided by a source server to perform additional behavior provided by a portal server. The page description (e.g., an HTML document) is associated with one or more items (e.g., a product). The enabling system executes at the portal server and receives a selection of the page description (e.g., a URL) from a client computer. The enabling system then retrieves from the source server the selected page description. The enabling system adds to the retrieved page description a user interface element that describes an action to be performed so that the additional behavior (e.g., placing an order for the product) can be performed for the associated item. The enabling system may also redirect to the portal server the navigation references of the retrieved page description so that all navigation based on the page description is routed through the portal server. When the enabling system intercepts these redirected navigation references, it can then retrieve and enable the referenced page description.

18 Claims, 9 Drawing Sheets

U.S. PATENT DOCUMENTS

| | | | | | |
|---|---|---|---|---|---|
| 5,724,424 | A | | 3/1998 | Gifford | |
| 5,732,219 | A | | 3/1998 | Blumer et al. | |
| 5,734,833 | A | | 3/1998 | Chiu et al. | |
| 5,754,857 | A | | 5/1998 | Gadol | |
| 5,757,917 | A | | 5/1998 | Rose et al. | |
| 5,758,327 | A | | 5/1998 | Gardner et al. | |
| 5,758,328 | A | | 5/1998 | Giovannoli | |
| 5,778,173 | A | | 7/1998 | Apte | |
| 5,781,632 | A | | 7/1998 | Odom | |
| 5,784,597 | A | | 7/1998 | Chiu et al. | |
| 5,790,677 | A | | 8/1998 | Fox et al. | |
| 5,794,207 | A | | 8/1998 | Walker et al. | |
| 5,797,127 | A | | 8/1998 | Walker et al. | |
| 5,799,157 | A | | 8/1998 | Escallon | |
| 5,799,285 | A | | 8/1998 | Klingman | |
| 5,809,144 | A | | 9/1998 | Sirbu | |
| 5,809,145 | A | | 9/1998 | Slik et al. | |
| 5,815,657 | A | | 9/1998 | Williams et al. | |
| 5,815,665 | A | | 9/1998 | Teper et al. | |
| 5,819,092 | A | | 10/1998 | Ferguson et al. | |
| 5,825,881 | A | | 10/1998 | Colvin, Sr. | |
| 5,826,241 | A | | 10/1998 | Stein et al. | |
| 5,848,161 | A | | 12/1998 | Luneau et al. | |
| 5,848,399 | A | * | 12/1998 | Burke | 705/27 |
| 5,850,442 | A | | 12/1998 | Muftic | |
| 5,850,446 | A | | 12/1998 | Berger et al. | |
| 5,862,223 | A | | 1/1999 | Walker et al. | |
| 5,933,811 | A | * | 8/1999 | Angles et al. | 705/14 |
| 6,006,256 | A | * | 12/1999 | Zdepski et al. | 709/217 |
| 6,038,668 | A | * | 3/2000 | Chipman et al. | 713/201 |
| 6,073,124 | A | * | 6/2000 | Krishnan et al. | 705/59 |
| 6,085,220 | A | * | 7/2000 | Courts et al. | 709/201 |
| 6,128,655 | A | * | 10/2000 | Fields et al. | 709/219 |
| 6,161,112 | A | * | 12/2000 | Cragun et al. | 707/501 |
| 6,170,021 | B1 | * | 1/2001 | Graf | 710/15 |
| 6,182,139 | B1 | * | 1/2001 | Brendel | 709/226 |
| 6,185,598 | B1 | * | 2/2001 | Farber et al. | 709/200 |
| 6,192,415 | B1 | * | 2/2001 | Haverstock et al. | 709/245 |
| 6,195,691 | B1 | * | 2/2001 | Brown | 709/219 |
| 6,202,081 | B1 | * | 3/2001 | Naudus | 709/200 |
| 6,256,631 | B1 | * | 7/2001 | Malcolm | 707/10 |
| 6,272,492 | B1 | * | 8/2001 | Kay | 707/10 |
| 2001/0016828 | A1 | * | 8/2001 | Philippe et al. | 705/26 |

OTHER PUBLICATIONS

Ganzel,R., "Universal Translator? Not Quite," Training, vol. 36, No. 4, pp. 22–24, Apr. 1999.* http:/babelfish.altavista.digital.com/cgi–bin/translate? Translation with Systran web page.[accessed Apr. 8, 1999].

Corresponding html document to Systran Web Page. [accessed Apr. 8, 1999].

wysiwyg://22/htpp://www.perkinscoie.com/. Perkins Coie LLP Web Page. [accessed Apr. 8, 1999].

Corresponding html document to Perkins Coie web page. [accessed Apr. 8, 1999].

wysiwyg://3http://babelfish.altavista.digital.com/cgi–bin/translate. Translated version of Perkins Coie Web Page. [accessed Apr. 8, 1999].

Corresponding html document to translation of Perkins Coie Web Page.

* cited by examiner

URL/Product Table 601

| URL | Product IDs | Purchase Button Location (Optional) 604, 605 |
|---|---|---|
| http://www.rating.com/computers/sofware/educational | Math1 ID<br>Spelling ID<br>Geography | |
| http://www.rating.com/computers/sofware/educational/math1 | Math1 ID | |
| ... | ... | |

603 — URL column
607 — first URL row
606 — second URL row

Product Table 602

| Product ID | Price | Image URL | Description | ... |
|---|---|---|---|---|
| Math1 ID | 29.95 | — | — | |
| Spelling ID | 15.95 | — | — | |
| Geography ID | 39.95 | — | — | |

608, 609, 610, 611 — column labels
612, 613, 614 — row labels

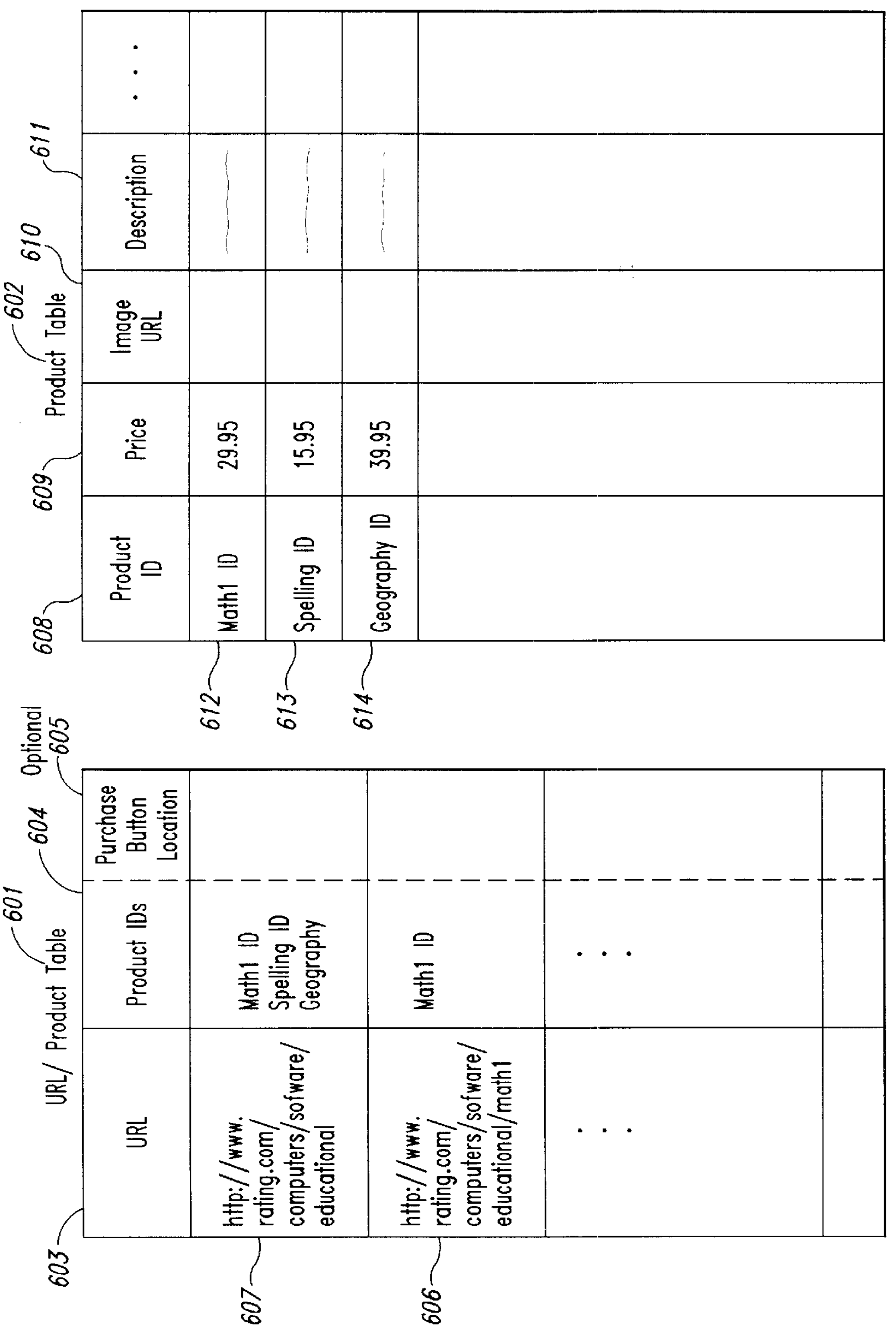

Fig. 6

METHOD AND SYSTEM FOR PROVIDING ADDITIONAL BEHAVIOR THROUGH A WEB PAGE

TECHNICAL FIELD

The present invention relates to transparently modifying an existing document and, in particular, to intercepting accesses to web pages and modifying the web page to add additional behavior.

BACKGROUND

Today's computer networking environments, such as the Internet, offer mechanisms for delivering documents between heterogeneous computer systems. One such network, the World Wide Web network, which comprises a subset of Internet sites, supports a standard protocol for requesting and receiving documents known as web pages. This protocol is known as the Hypertext Transfer Protocol, or "HTTP." HTTP defines a high-level message passing protocol for sending and receiving packets of information between diverse applications. Details of HTTP can be found in various documents including T. Berners-Lee et al., *Hypertext Transfer Protocol—HTTP 1.0*, Request for Comments (RFC) 1945, MIT/LCS, May 1996. Each HTTP message follows a specific layout, which includes among other information, a header which contains information specific to the request or response. Further, each HTTP request message contains a universal resource identifier (a "URI"), which specifies to which network resource the request is to be applied. A URI is either a Uniform Resource Locator ("URL") or Uniform Resource Name ("URN"), or any other formatted string that identifies a network resource. The URI contained in a request message, in effect, identifies the destination machine for a message. URLs, as an example of URIs, are discussed in detail in T. Berners-Lee, et al., *Uniform Resource Locators* (*URL*), RVC 1738, CERN, Xerox PARC, Univ. of Minn., December 1994.

FIG. 1 illustrates how a browser application enables users to navigate among nodes on the web network by requesting and receiving web pages. For the purposes of this discussion, a web page is any type of document that abides by the HTML format. That is, the document includes an "<HTML>" statement. Thus, a web page is also referred to as an HTML document. The HTML format is a document mark-up language, defined by the Hypertext Markup Language ("HTML") specification. HTML defines tags for specifying how to interpret the text and images stored in an HTML document. For example, there are HTML tags for defining paragraph formats and for emboldening and underlining text. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language—2.0*, RFC 1866, MIT/W3C, November 1995.

In FIG. 1, a web browser application 101 is shown executing on a client computer 102, which communicates with a server computer 103 by sending and receiving HTML packets (messages). The web browser "navigates" to new locations on the network to browse (display) what is available at these locations. In particular, when the web browser "navigates" to a new location, it requests a new document from the new location (e.g., the server computer) by sending an HTTP-request message 104 using any well-known underlying communications wire protocol. The HTTP-request message follows the specific layout discussed above, which includes a header 105 and a URI field 106, which specifies the network location to which to apply the request. When the server computer specified by URI receives the HTTP-request message, it interprets the message packet and sends a return message packet to the source location that originated the message in the form of an HTTP-response message 107. In addition to the standard features of an HTTP message, such as the header 108, the HTTP-response message contains the requested HTML document 109. When the HTTP-response message reaches the client computer, the web browser application extracts the HTML document from the message, and parses and interprets (executes) the HTML code in the document and displays the document on a display screen of the client computer as specified by the HTML tags.

The World Wide Web is especially conducive to conducting electronic commerce ("e-commerce"). E-commerce generally refers to commercial transactions that are at least partially conducted using the World Wide Web. For example, numerous web sites are available through which a user using a web browser can purchase items, such as books, groceries, and software. A user of these web sites can browse through an electronic catalog of available items to select the items to be purchased. To purchase the items, a user typically adds the items to an electronic shopping cart and then electronically pays for the items that are in the shopping cart. The purchased items can then be delivered to the user via conventional distribution channels (e.g., an overnight courier) or via electronic delivery when, for example, software is being purchased.

Many web sites that provide electronic catalogs, however, are not e-commerce enabled. That is, a user can browse through the catalog using a web browser, but the user cannot purchase the items in the catalog electronically. For example, a watch manufacturer may provide an electronic catalog:of all the watches made by the manufacturer. The catalog may include detailed specifications of the watches and may even include the retail price of the watches. Rather than allowing a user to purchase a watch electronically, the catalog may direct a user to a local retail merchant through which the watches can be purchased. It would be desirable to have a mechanism in which such web sites that are not e-commerce enabled could be easily enabled to conduct e-commerce. Many web sites also provide general information relating to various items. For example, a web site by a chamber of commerce may provide a high-level description of the hotels of a resort area. It would be desirable to have a mechanism in which such web sites could be enabled to allow users to make reservations at the various hotels or to obtain a more detailed description of hotels.

More generally, many web sites provide web pages relating to various items. These items may relate to things of any topic. The term "item" as used herein refers to any such thing. For example, an item can include an historical topic, a medical topic, a current event topic, a product, a service and so on. In general, it would be desirable to have a mechanism in which web pages from such web sites can be augmented with additional behavior. Such additional behavior may allow for the e-commerce enabling of web pages or for the providing additional information.

SUMMARY

A method and system for enabling a page description provided by a source server to perform additional behavior provided by a portal server is provided. The additional behavior may include new behavior or a modification of existing behavior. The page description (e.g., an HTML document) is associated with one or more items (e.g, a product). The enabling system executes at the portal server and receives a selection of the page description (e.g., a URL) from a client computer. The enabling system then retrieves from the source server the selected page description. The enabling system modifies the retrieved page description so that the additional behavior can be performed in response to user input. For example, the enabling system may add to the retrieved page description a user interface element that, when selected, causes the additional behavior (e.g., placing an order for the product) to be performed based on the item associated with the page description. The enabling system may also redirect to the portal server the navigation references of the retrieved page description so that all navigation based on the page description is routed through the portal server. When the enabling system intercepts these redirected navigation references, it can then retrieve and enable the referenced page description. Alternatively, the enabling system may use a proxy server to intercept navigation references. In one embodiment, the additional behavior is the providing of information that is not provided by the source server. In another embodiment, the additional behavior is the adding of the item to an electronic shopping cart. The user interface element may be a button that a user selects to activate the additional behavior or may be a more complex user interface such as a frame that contains various options.

BRIEF DESCRIPTION OF THE DRAWINGS

FIG. 6 is a block diagram illustrating the tables of the ECE portal system.

DETAILED DESCRIPTION

Figure 1:
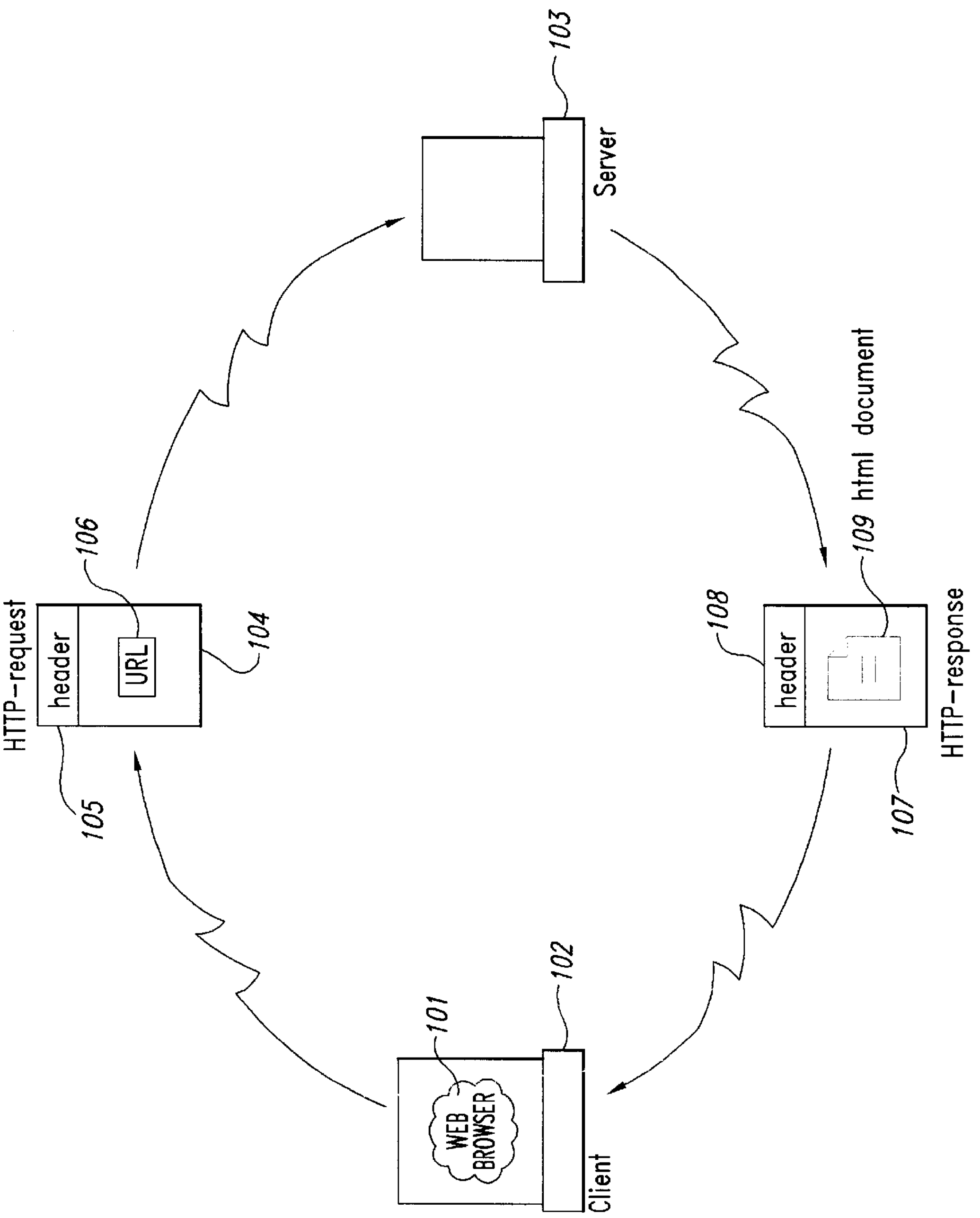
FIG. 1 illustrates how a browser application enables users to navigate among nodes on the web network by requesting and receiving web pages.

A method and system for augmenting a web page to perform additional behavior is provided. In one embodiment, the web page augmentation system of the present invention is an e-commerce enabling ("ECE") portal system that dynamically augments a source web page relating to an item with additional behavior. The ECE portal system may be implemented as a e-commerce enabling web site that e-commerce enables web pages of a source web site. A user can request the ECE portal system to provide access to a source web page and to augment that web page with additional behavior that is e-commerce enabling. When the ECE portal system receives the request (e.g, a HTTP-request message that designates the source web page), it retrieves the source web page from the source web site. The ECE portal system then augments the source web page with the additional behavior relating to the item. The ECE portal system may, for example, add a button to the source web page that when selected, navigates to a web page provided by the e-commerce enabling web site to add the item to a shopping cart or may replace the behavior of an existing button of the source web page. The ECE portal system then provides the augmented web page to the user's client computer. The user's web browser then displays the augmented web page to the user. When the user performs an action that selects the additional behavior (e.g., selects a button), the web browser notifies the ECE portal system. The ECE portal system can then affect the performing of the additional behavior. For example, the ECE portal system may provide an additional web page with information relating to the item of the source web page or may simply add the item relative to the source web page to an electronic shopping cart. By intercepting the request for source web pages, the ECE portal system can provide the additional behavior relating to an item of a source web page.

The ECE portal system can effect the intercepting of requests in several ways. In one embodiment, the ECE portal system redirects the navigation URLs of each source web page that it provides to a client computer. The ECE portal system redirects the navigation URLs by modifying the HTML document so that the URLs point to the ECE portal web site and include information for identifying the source web pages corresponding to the URL before being redirected. When a user selects a redirected URL, the navigation request is sent to the ECE portal system. When the ECE portal system receives the request, it retrieves the source web page that corresponds to the URL before being redirected and then redirects the navigation URLs in that newly-retrieved source web page. The ECE portal system may also augment that source web page with additional behavior before sending the web page to the client computer. In this way, the ECE portal system can intercept the navigation requests of a source web page and augment the source web pages before providing them to a client computer.

The redirecting of the navigation URLs by modifying the HTML document that represents a web page may not effect the redirecting of some URLs that are dynamically generated when the browser processes the web page. Relative URLs that are dynamically generated can, however, be redirected. When a relative URL is dynamically generated, it is routed to the server of the web page in which the URL is embedded. Since the embedding web page is provided by the ECE portal system, the relative URLs are routed to the ECE portal system. The HTTP-request message for the relative URL also includes the complete URL of the embedding URL (also referred to as a "referring URL"). The ECE portal system can look at the embedding URL to identify the source server because the identification of the source server was included when the ECE portal system redirected the navigation URL to that web page. The ECE portal system can then instruct the browser to redirect the relative URL to the source server. When the ECE redirects the static navigation URLs of a web page, it can place a special flag in each URL to indicate that the URL has been redirected. In this way, the ECE portal system can distinguish redirected URLs that it receives from dynamically generated relative URLs so that the relative URLs can be identified and redirected. Two alternate ways of redirecting the navigation URLs defer the redirecting until after URLs are dynamically generated can effect the redirecting of all URLs. In one embodiment, the ECE portal system installs an URL intercepting component on the client computer. Whenever the browser sends a navigation request, the URL intercepting component receives the request and redirects the request to the ECE portal system. Alternately, the ECE portal system can configure the browser of the client computer so that the ECE portal web site acts as a proxy server for the browser. When acting as a proxy server, the ECE portal web site receives all navigation requests from the browser. With deferred redirecting, the ECE portal system receives all navigation requests, even absolute URLs that are generated dynamically, and can augment the requested web pages before providing them to the client computer.

Figure 2A:
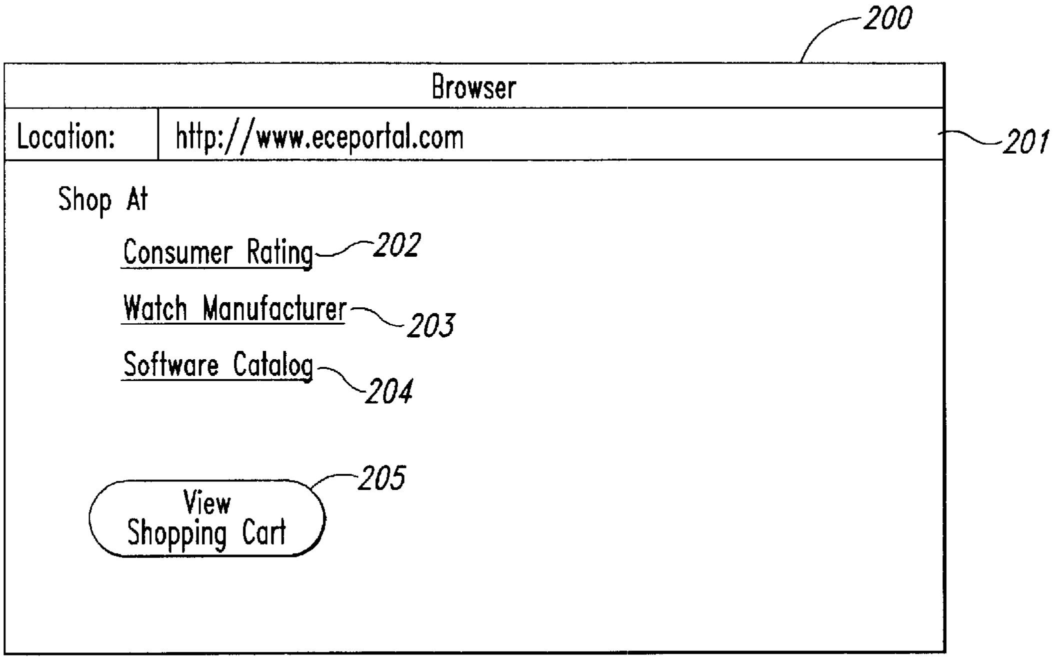
FIG. 2A illustrates the initial web page of the ECE portal system in one embodiment.

FIG. 2A illustrates the initial web page of the ECE portal system in one embodiment. When a client wants to access an augmented source web page using the ECE portal system, the user enters the URL of the ECE portal system (e.g., "http://www.eceportal.com"). When the ECE portal system receives this URL, the system provides this initial web page to the user's client computer. The browser at the user's computer displays this initial web page in window 2A00. The browser may also display a location line 2A01 to indicate the URL of the web page being displayed. In this example, the web page indicates that the ECE portal system can e-commerce enable a consumer rating web site 2A02, a watch manufacturer web site 2A03, and a software catalog web site 2A04 to allow users to order items relating to those web sites. When the user selects one of these source web sites, the ECE portal system retrieves a web page from that web site and redirects the URLs of that web page and, as appropriate, augments that web page. The view-shopping-cart button 2A05 allows the user to view the current contents of their shopping cart that is maintained by the ECE portal system. For example, if the user selects the consumer rating web site, the ECE portal system redirects and augments the web pages at that web site so that users can place orders for items that have been rated.

Figure 2B:
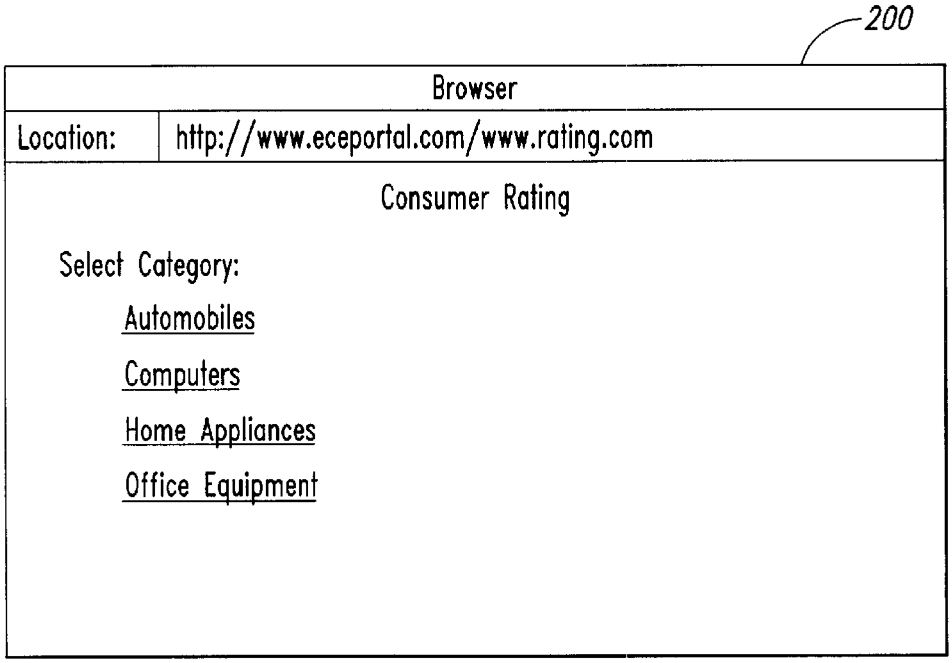
FIG. 2B illustrates the display of a web page of a source web site.

FIG. 2B illustrates the display of a web page of a source web site. In this example, the source web site provides a consumer rating service. This source web page identifies the top of a category hierarchy through which a user can browse to select the items that are rated by the consumer rating service. In this example, the ECE portal system modified the source web page to redirect the navigation URLs to the ECE portal web site. In this way, the ECE portal system can intercept all navigations to other web pages so that they can be augmented as appropriate. In this example, the ECE portal system did not augment this source web page to provide additional behavior because the page is not associated with specific items. This web page was displayed as a result of the user selecting the "consumer rating" URL of FIG. 2A. The URL for the consumer rating web page is "http://www.rating.com." The redirected URL for this web is "http://www.eceportal.com/www.rating.com" as shown by the location line 2A01 of window 2A00.

Figure 3:
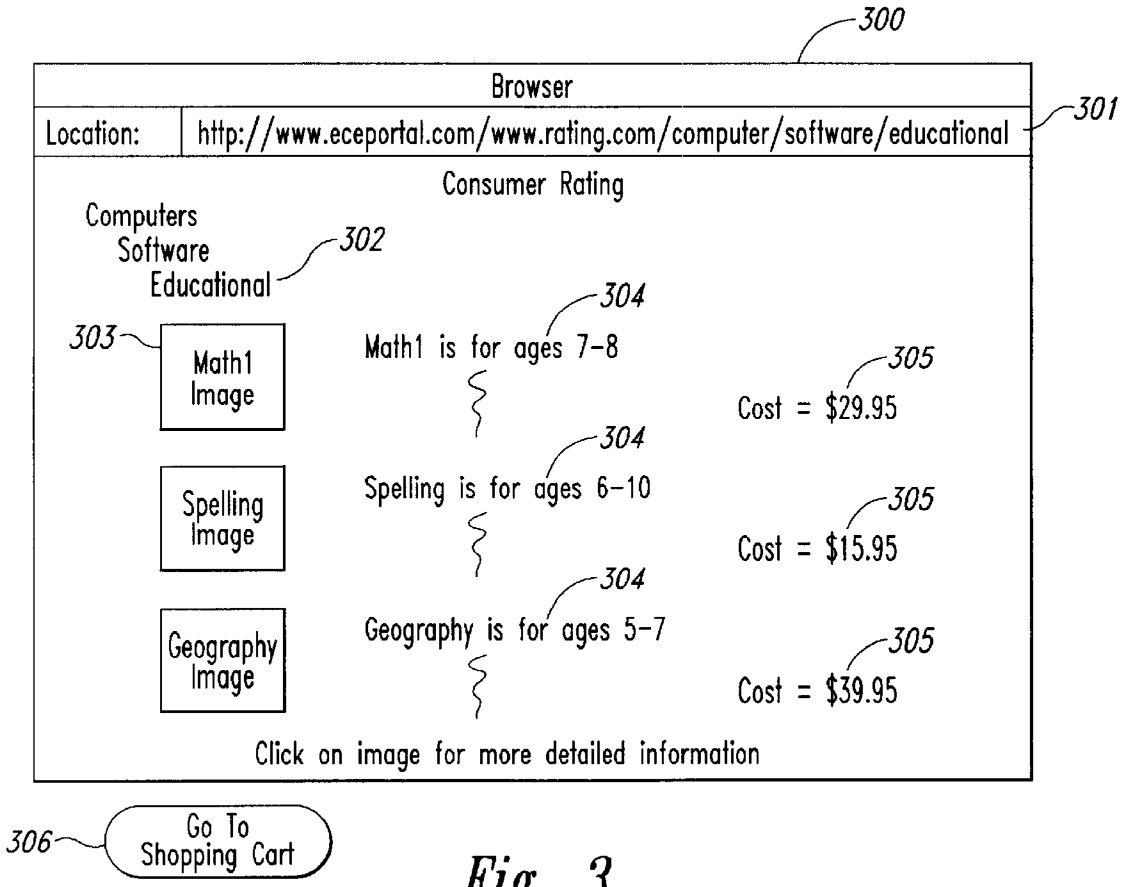
FIG. 3 illustrates the display of a source web page as the user browses through the category hierarchy of the consumer rating web site.
Figure 4:
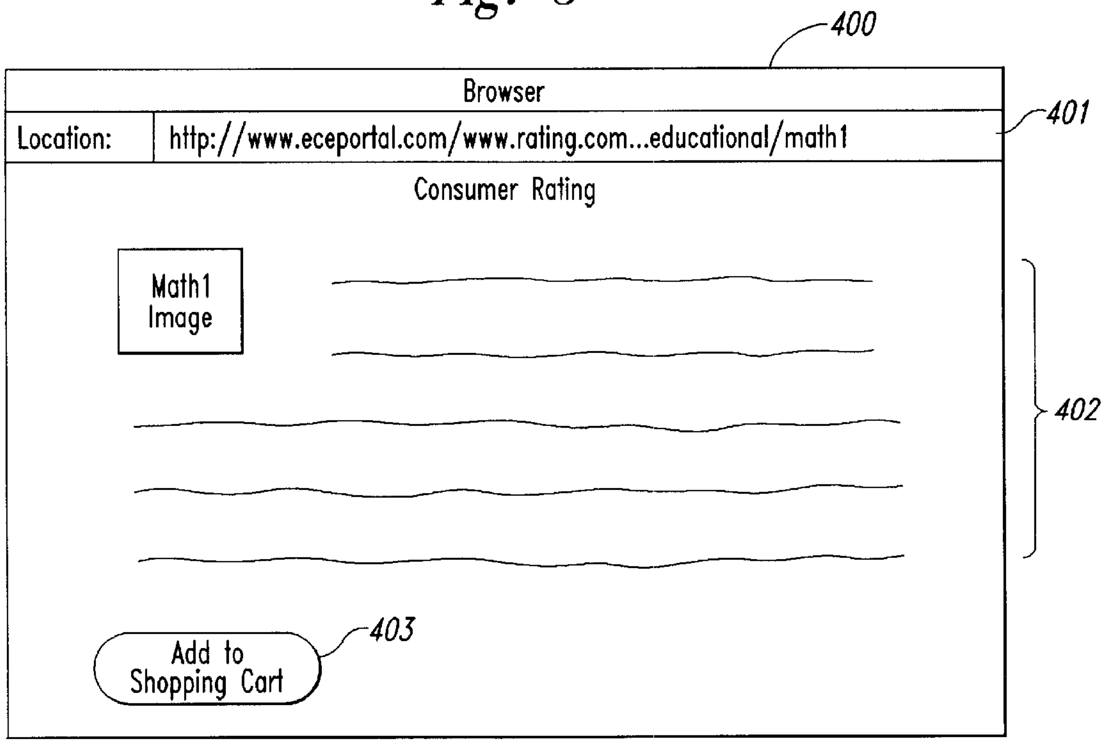
FIG. 4 illustrates the display of the web page with detailed information on the Math 1 software product.

FIG. 3 illustrates the display of a source web page as the user browses through the category hierarchy of the consumer rating web site. This source web page contains information relating to educational computer software items. The window 300 contains a location line 301 which indicates that the web page is provided by be ECE portal system but has information encoding the source web page. The web page also contains an indication 302 that the browse hierarchy is "computers," "software," and "educational." This web page displays detailed information on three software products: Math1, Spelling, and Geography. The detailed information includes an image 303, a description 304, and a price 305 for each item. When a user selects the image of an item, then a source web page with more detailed information on the item is displayed. FIG. 4 illustrates the display of the web page with detailed information on the Math 1 software product. The original source web page included a detailed description 402 of the product. The ECE system augmented this source web page by adding an add-to-shopping-cart button 403 at the bottom of the web page. When the user selects the add to shopping cart button, the ECE portal system receives an HTTP-request message that identifies the URL associated with that button. The ECE portal system then adds the Math 1 software product to the user's shopping cart. One skilled in the art will appreciate that source web pages can be augmented in many different ways and with many different types of additional behavior. For example, a source web page can be augmented with a button that provides a link to another web page that provides detailed information on the item or items of that web page. A consumer rating web site, for example, can augment the web pages of a manufacturer so that a user can easily retrieve consumer rating information on the manufacturer's products. As another example, a political organization may augment a web page of an opposing political organization to include links to web pages that rebut the topics of the web pages. As yet another example, a company may augment the web pages of a competitor with a link to a web page that lists the advantages of the companies products so that the company's sales force can be more fully prepared or even use the augmented web pages when making a sales call.

Figure 5:
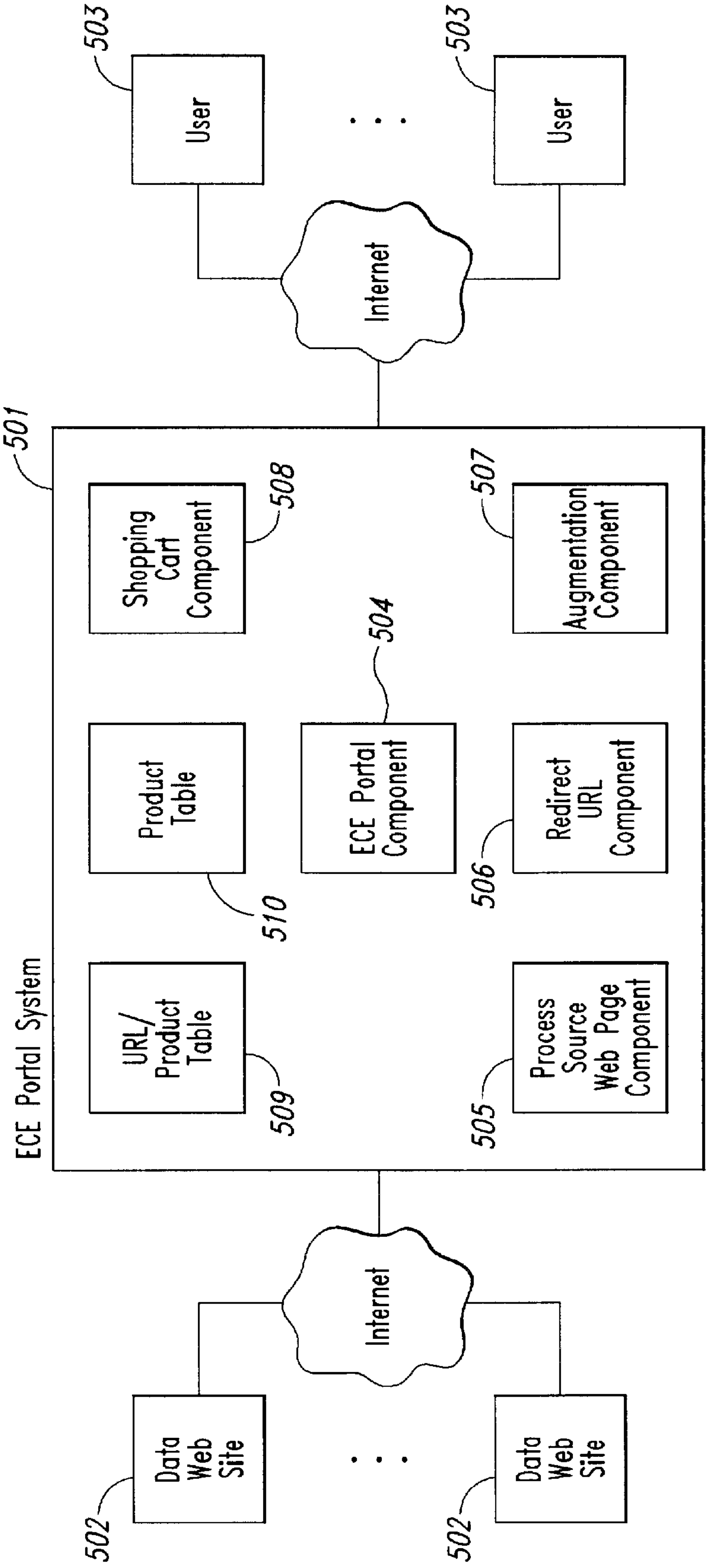
FIG. 5 is a block diagram illustrating the components of the ECE portal system.

FIG. 5 is a block diagram illustrating the components of the ECE portal system. The ECE portal system 501 is connected via the Internet to source web sites 502 and user computers 503. The ECE portal system includes an ECE portal component 504, a process source web page component 505, a redirect URL component 506, an augmentation component 507, and a shopping cart component 508. The ECE portal system also includes a URL/product table 509 and a product table 510. The ECE portal component receives requests for source web pages identified by URLs and e-commerce enables the source web pages that are related to an item. The process source web page component e-commerce enables a web page by redirecting each navigation URL in the web page to specify the ECE portal web site and, as appropriate, augmenting the web page to include an add-to-shopping-cart button. The process source web page component invokes the redirect URL component to redirect the URLs of the source web page and, as appropriate, invokes augmentation component. When the ECE portal system receives an indication that the user wants to add an item to a shopping cart, it invokes shopping cart component 508, which may function as a conventional shopping cart component. The URL/product table contains a mapping of the URLs that relate to items (e.g., contain a description of the items) to the product identifiers of those items. The product identifiers may be a stock keeping unit ("SKU)" or some other unique identifier. For example, the URL/product table would contain an entry for the URL of the detailed web page for the Math1 product along with the SKU of that product. The process source web page component determines whether a URL points to a web page relating to an item by checking the URL/product table. If that URL is in the table, then the referenced web page relates to an item. The product table contains an entry for each product that can be purchased via the ECE portal system. The product table may be a conventional product table that is indexed by the product identifier. The server computers that host the ECE portal web site and the source web sites and the client computers may include a central processing unit, memory, and input/output devices. The ECE portal web site may include many computers and may even encompass computers of different providers of the various components of the ECE portal system. The components and data structures of the ECE portal system may be stored on computer-readable media such as memory, CD-ROM, flexible disk, hard disk, and so on or may be transmitted via a data transmission medium.

The components may be implemented as computer instructions that are executed by a computer.

FIG. 6 is a block diagram illustrating the tables of the ECE portal system. The URL/product table 601 contains a URL column 603, a product ID column 604, and an optional purchase button location column 605. Each entry 606–607 contains a URL of a source web page that can be e-commerce enabled and the product ID of the item or items relating to that web page. The purchase button location column is optional and is used to indicate where add-to-shopping-cart buttons should be located on the web page. In particular, when a source web page relates to more than one item, the ECE portal system may augment that web page with an add-to-shopping-cart button for each item at locations indicated by this column. The product table contains a product ID column 608, a price column 609, an image URL column 610, a description column 611, and so on. Each entry 612–614 contains information relating to a certain product. For example, entry 612 corresponds to the Math 1 product and contains the product identifier of the Math 1 product (i.e., "Math1 ID"), the price of the Math1 product, and other information relating to that product.

Figure 7:
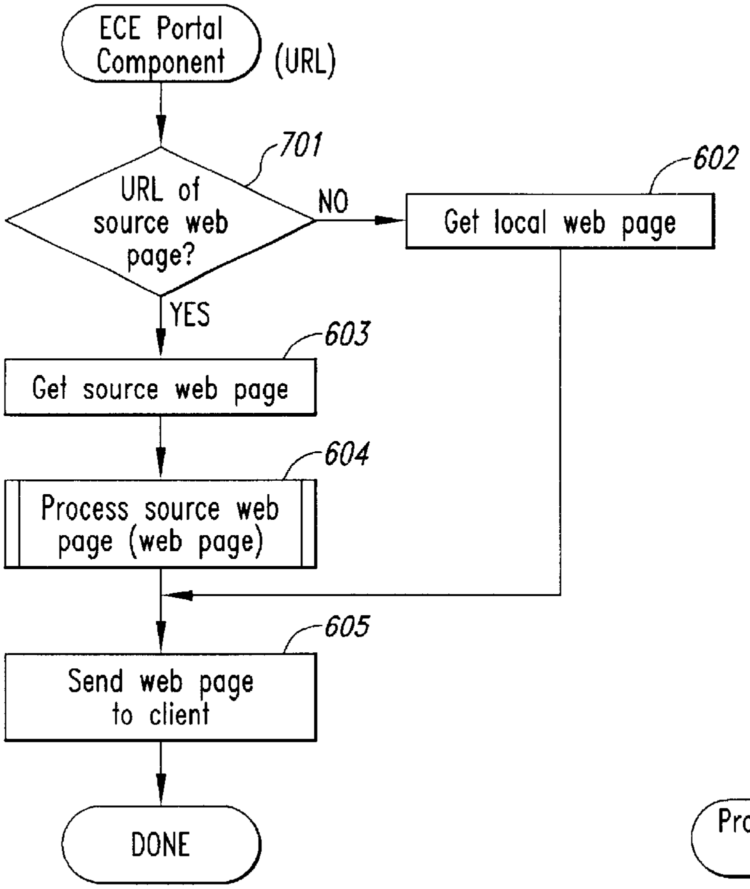
FIG. 7 is a flow diagram of an example implementation of the ECE portal component.

FIG. 7 is a flow diagram of an example implementation of the ECE portal component. The component is passed a URL that is received from the user computer. The component determines whether the URL is for a local web page of the ECE portal web site (e.g., a shopping cart-related web page) or a source web page. If the URL is for a source web page, then the component e-commerce enables the web page, as appropriate, before providing it to the user computer. In step 701, if the URL is to a source web page, then the component continues at step 703, else the component continues at step 702. In step 702, the component retrieves the local web page corresponding to that URL. In step 703, the component retrieves the source web page from the source web site. In step 704, the component invokes the process source web page component to e-commerce enable the passed source web page. In step 705, the component provides the local web page or the modified source web page to the client computer and completes.

Figure 8:
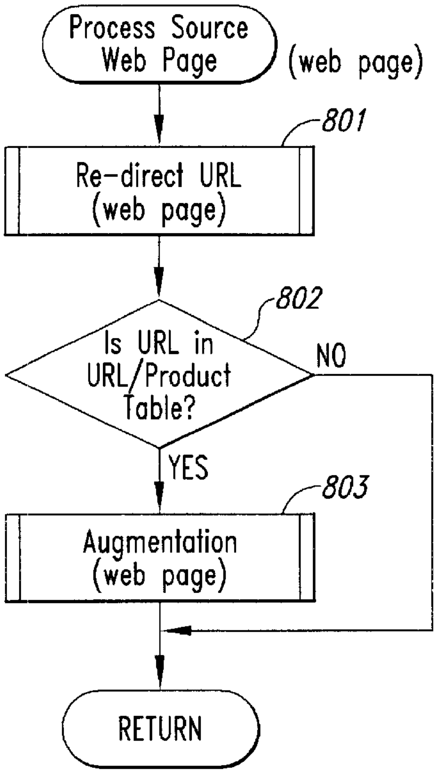
FIG. 8 is a flow diagram of an example implementation of the process source web page component.

FIG. 8 is a flow diagram of an example implementation of the process source web page component. This component is passed a web page and redirects its URLs and augments the web page as appropriate. In step 801, the component invokes the redirect URLs component passing the web page. In step 802, if the URL of the web page is in the URL/product table, then the web page should be augmented and the component continues at step 803, else the component completes. In step 803, the component invokes the augmentation component passing the web page and then returns.

Figure 9:
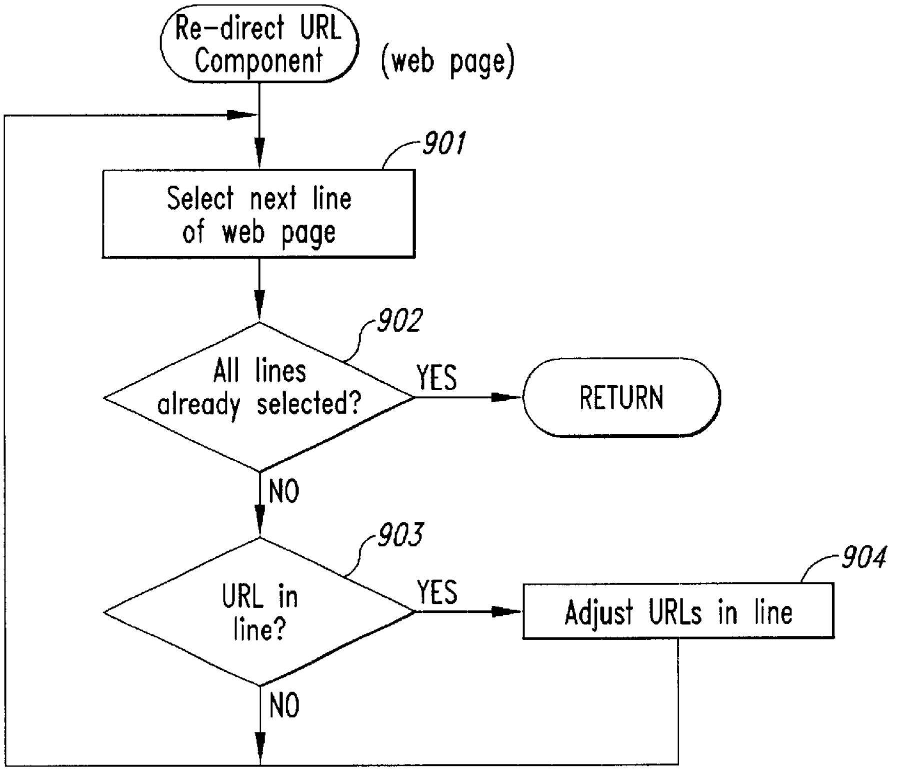
FIG. 9 is a flow diagram of an example implementation of the redirect URL component.

FIG. 9 is a flow diagram of an example implementation of the redirect URL component. This component is passed a web page and searches for each navigation URL and redirects the URL to the ECE portal web site. The URLs may be redirected in many different ways. For example, the component may insert the ECE portal web address (e.g., "www.eceportal.com") after the hypertext transfer protocol designation (i.e., "http://"). Alternatively, the component may replace a navigation URL with another URL that includes an encoding of the source URL (e.g., an index into a table that contains the source URL) which is decoded by the ECE portal system when the URL is received as a navigation request. This component loops selecting each line of the web page and modifying the navigation URLs in the line. In step 901, the component selects the next line of the web page. In step 902, if all the lines of the web page have already been selected, then the component returns, else the component continues at step 903. In step 903, if a navigation URL is in the selected line, then the component continues at step 904, else the component loops to step 901 to select the next line. In step 904, the component adjusts the URL in the selected line and loops to step 901 to select the next line.

Figure 10:
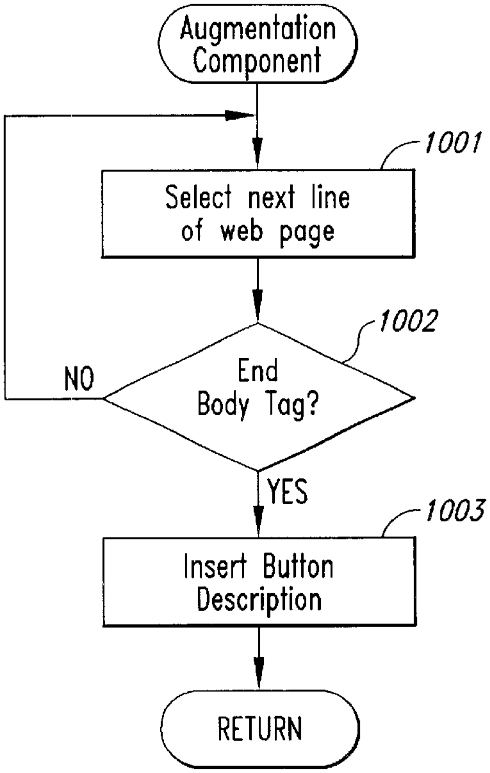
FIG. 10 is a flow diagram of an example implementation of the augmentation component.

FIG. 10 is a flow diagram of an example implementation of the augmentation component. This component adds a purchase button at the end of the passed web page. The component locates the ending body tag of the HTML document and adds the HTML code for the purchase button before that tag. In step 1001, the component selects the next line of the web page. In step 1002, if the selected line contains an end body tag, then the component continues at step 1003, else the component loops to step 1001 to select the next line of the web page. In step 1003, the component inserts the purchase button code before the end body tag and returns. Alternatively, if the web page relates to multiple items indicated by the URL/product table entry for the URL of the passed web page, then the component may add a purchase button for each item at the locations specified by the entry.

Figure 11:
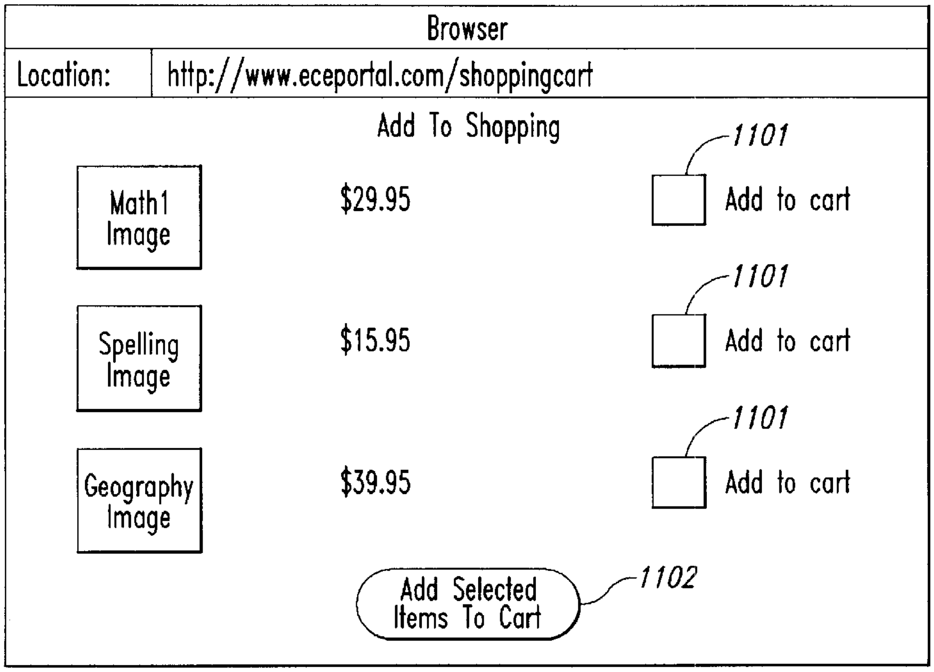
FIG. 11 illustrates a web page for adding items from a multiple item source web page to a shopping cart.

As discussed above, the ECE portal system may e-commerce enable a web page that relates to multiple items. In such a situation, a single button cannot be used to uniquely identify one of the items to be added to a shopping cart. For example, a go-to-shopping-cart button 306 could be added at the end of the web page of FIG. 3. When the user selects the go-to-shopping-cart button, the ECE portal system receives the navigation URL for that button and displays a web page that lists each of the items so they can be individually added to the shopping cart. FIG. 11 illustrates a web page for adding items from a multiple item source web page to a shopping cart. In this example, the ECE portal system identifies the multiple items associated with the web page from the entry for the URL of the web page in the URL/product table. The ECE portal system then generated this web page based on information in the product table. When the user selects the add-selected-items-to-cart button 1102, the ECE portal system adds the selected items 1101 to the user's shopping cart.

Figure 12:
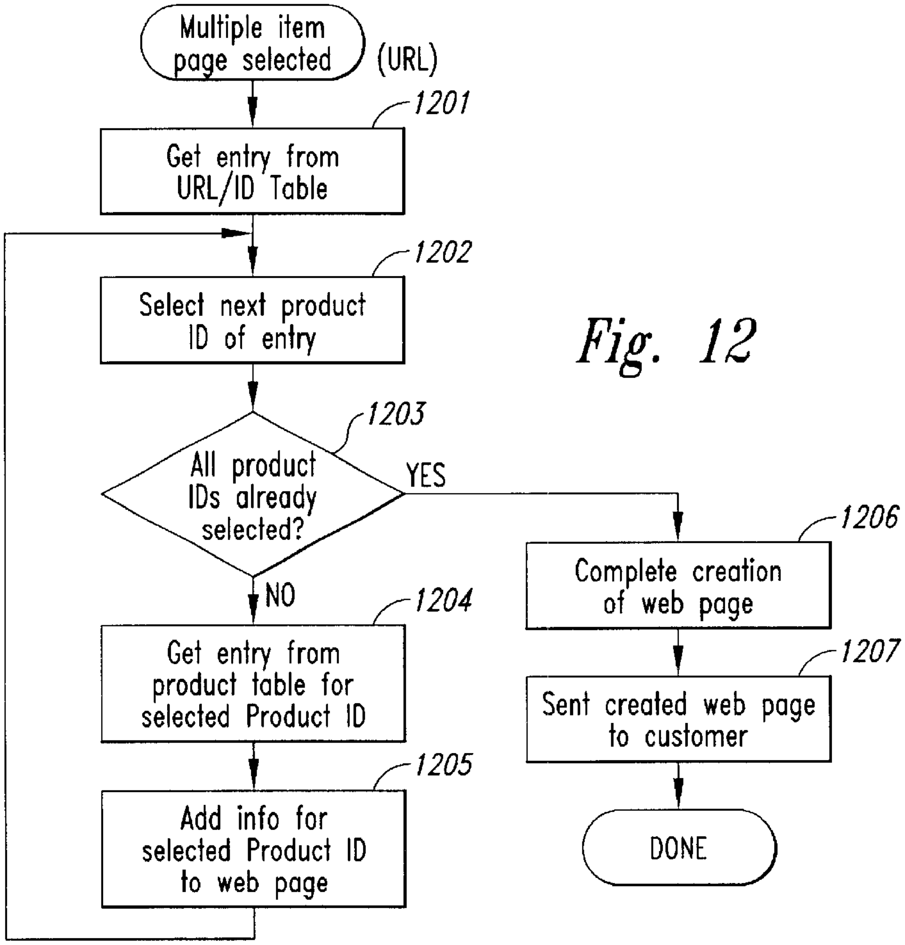
FIG. 12 is a flow diagram of an example implementation of a component to create a web page for selecting which of the multiple items of a source web page are to be added to the shopping cart.

FIG. 12 is a flow diagram of an example implementation of a component to create a web page for selecting which of the multiple items of a source web page are to be added to the shopping cart. In step 1201, the component retrieves the entry for the passed URL from the URL/product table. In steps 1202–1205, the component loops selecting each of the multiple products associated with the passed URL and adds information for that product to the web page. In step 1202, the component selects the next product ID of the retrieved entry. In step 1203, if all the product IDs of the retrieved entry have already been selected, then the component continues at step 1206, else the component continues at step 1204. In step 1204, the component retrieves the entry from the product table for the selected product ID. In step 1205, the component adds information from the selected entry to the web page and loops to step 1202 to select the next product ID. In step 1206, the component completes the creation of the web page. In step 1207, the component sends the create web page to the client computer and completes.

Figure 13:
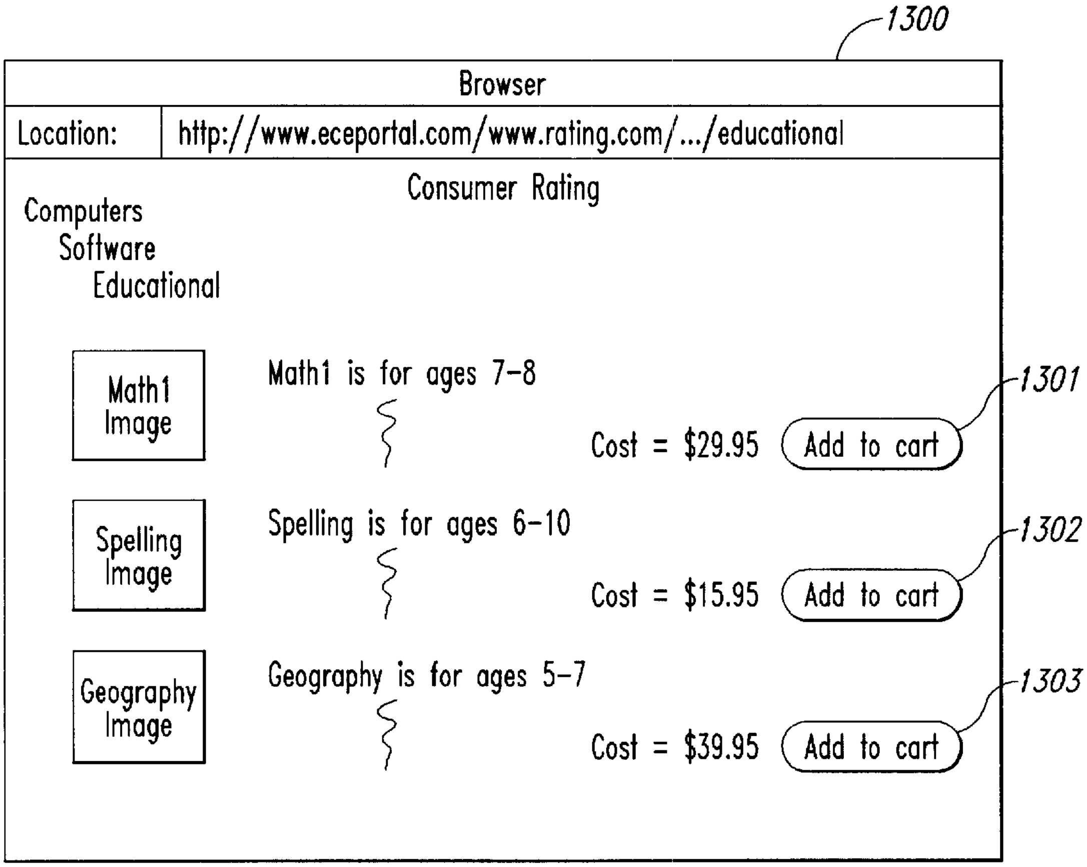
FIG. 13 illustrates a web page with multiple items after it is e-commerce enabled.

FIG. 13 illustrates a web page with multiple items after it is e-commerce enabled. In this example, web page 1300 corresponds to the web page of FIG. 3. However, the ECE portal system has added purchase buttons 1301–1303 for each item on the web page. When the user selects an add-to-shopping-cart button, the ECE portal system receives the request for a URL associated with an item and can uniquely identify that item and automatically add that item to shopping cart.

Although specific embodiments have been described, it is not intended that the invention be limited to these embodiments. One skilled in the art will appreciate that various modifications can be made without deviating from the spirit of the invention. For example, the ECE portal system can be used to augment web pages of web sites that are already e-commerce enabled. Such augmentation can provide a single shopping cart to which items from multiple web sites can be added and purchased in a single transaction. Also, such augmentation can also provide a portal through which preferred customers can purchase items at discounted rates. The ECE portal system can be adapted to operate in conjunction with any display description language and is not limited to HTML. Also, the user interfaces added to source web pages can be more complex than buttons. For example, the user interface can be a frame that describes different additional behaviors such as purchasing an item or requesting more information for an item of the page. The frame may also provide item specific information that is not included on the source web page such as the price of an item. The augmentation system may also provide behavior without modifying the user interface of a source web page. For example, the server for the source web page may allow a purchaser to purchase an item using only one type of credit card. The augmentation system may enable the use of other types of credit cards. In one embodiment, augmentation system would intercept the credit card information and decide whether the information is for an augmented type of credit card. If so, the augmentation system would charge the purchaser's credit card account and substitute a credit card number for an allowed type of credit card before sending the purchase request to the server of the source web page. As another example, the augmented behavior may be to log communications between the server of the source web page and the client. The augmented behavior may also be a fraud detection algorithm to determine whether the user of the client computer may be trying to perpetuate a fraud. The invention is defined by the claims that follow.

What is claimed is:

1. A method in a computer system for displaying a source page description provided by a source system that has been augmented for performing additional behavior by a portal system, the source page description relating to an item, the method comprising:

sending to the portal system information identifying the source page description;

receiving an augmented source page description that has been augmented by the portal system so that a user can take an action to perform the additional behavior that relates to the item; and taking the action to perform the additional behavior whereby a notification is sent to the portal system and the portal system effects the performing of the additional behavior for the item wherein the source page description is a web page and wherein the web page is not e-commerce enabled and the additional behavior causes the web page to be e-commerce enabled.

2. The method of claim 1 wherein the additional behavior is not provided by the source system.

3. The method of claim 1 wherein the portal system is a proxy server for the computer system.

4. The method of claim 1 wherein a proxy server receives information identifying the web page and forwards the information to the portal system.

5. A computer-readable medium containing instructions for causing a portal computer to enable a source web page to provided by a source computer to perform additional behavior provided by the portal computer, the web page relating to an item, by:

receiving a selection of the source web page;

retrieving from the source computer the source web page;

adding to the retrieved source web page an element for indicating that the additional behavior is to be performed for the item; and causing navigational references of the source web page to be redirected to the portal computer wherein the additional behavior is e-commerce enabling of the source web page.

6. The computer-readable medium of claim 5 wherein the causing of the navigational references to be redirected includes modifying the navigational references within the source web page.

7. The computer-readable medium of claim 5 wherein the causing of the navigational references to be redirected includes using a proxy server to receive all the navigational references wherein the proxy server routes the navigational references to the portal computer.

8. The computer-readable medium of claim 5 wherein the additional behavior is placing of an order for the item.

9. The computer-readable medium of claim 5 wherein the source web page relates to multiple items and including adding a user interface element for each item.

10. A method at a portal web site for modifying source web pages of a source web site to be e-commerce enabled, the source web page being associated with an item, the method comprising:

providing to a client computer a reference to the source web site such that the portal web site is notified when a user of the client computer selects the reference;

receiving notification that the user selected the reference;

retrieving the source web page from the source web site;

adding an element for conducting e-commerce relating to the item to the source web page;

causing navigation references of the source web page to be redirected to the portal web site; and providing the source web page with the added element to the client computer whereby the user performs an action relative to the added element to initiate e-commerce.

11. The method of claim 10 wherein the portal web site includes a mapping of source web pages to items relating to the source web page.

12. The method of claim 10 wherein the portal web site include information relating to the item that is not available at the source web site.

13. The method of claim 10 wherein the element is a button to add the item to a shopping cart.

14. The method of claim 10 wherein the causing of navigation references of the source web page to be redirected includes modifying the navigation references to specify the portal web site.

15. The method of claim 10 wherein the causing of navigation references of the source web page to be redirected includes using a proxy server.

16. The method of claim 10 including displaying the web page at the client computer.

17. A computer-readable medium containing a source web page that has been provided by a source web site and that has been modified by a portal web site to include a user interface element for providing additional behavior relating to an item associated with the web page and to redirect navigation references to the portal web site wherein the source web page as provided by the source web site is not e-commerce enabled and user interface element e-commerce enables the web page.

18. The computer-readable medium of claim 17 wherein the medium is a data transmission medium.

* * * * *

UNITED STATES PATENT AND TRADEMARK OFFICE

CERTIFICATE OF CORRECTION

PATENT NO. : 6,401,077 B1
DATED : June 4, 2002
INVENTOR(S) : Godden et al.

It is certified that error appears in the above-identified patent and that said Letters Patent is hereby corrected as shown below:

Column 2,
Line 37, delete colon between “catalog” and “of”;

Signed and Sealed this

Twenty-seventh Day of August, 2002

*Attest:*

JAMES E. ROGAN

*Attesting Officer* *Director of the United States Patent and Trademark Office*